(12) United States Patent
Asakawa

(10) Patent No.: US 11,326,514 B2
(45) Date of Patent: May 10, 2022

(54) VARIABLE CAPACITY TURBOCHARGER

(71) Applicant: IHI Corporation, Tokyo (JP)

(72) Inventor: Takao Asakawa, Tokyo (JP)

(*) Notice: Subject to any disclaimer, the term of this patent is extended or adjusted under 35 U.S.C. 154(b) by 0 days.

(21) Appl. No.: 17/133,630

(22) Filed: Dec. 24, 2020

(65) Prior Publication Data

US 2021/0115850 A1 Apr. 22, 2021

Related U.S. Application Data

(63) Continuation of application No. PCT/JP2019/014534, filed on Apr. 1, 2019.

(30) Foreign Application Priority Data

Jul. 11, 2018 (JP) .............................. JP2018-131638

(51) Int. Cl.
*F02C 6/12* (2006.01)
*F01D 17/16* (2006.01)
*F01D 25/16* (2006.01)

(52) U.S. Cl.
CPC .............. *F02C 6/12* (2013.01); *F01D 17/165* (2013.01); *F01D 25/162* (2013.01)

(58) Field of Classification Search
CPC .......... F02C 6/12; F02B 37/24; F01D 17/165; F01D 25/162
USPC .............................. 415/146 and, 160; 60/602
See application file for complete search history.

(56) References Cited

U.S. PATENT DOCUMENTS

| 6,884,025 B2* | 4/2005 | Pickens .................... F01D 17/16 415/160 |
| 7,670,107 B2* | 3/2010 | Barthelet .............. F01D 17/165 415/160 |
| 10,465,601 B2* | 11/2019 | Ikeda .................... F01D 17/165 |
| 2006/0188368 A1 | 8/2006 | Jinnai et al. |
| 2007/0068155 A1 | 3/2007 | Hayashi et al. |

(Continued)

FOREIGN PATENT DOCUMENTS

| CN | 104141513 | 11/2014 |
| CN | 104937235 | 9/2015 |

(Continued)

OTHER PUBLICATIONS

International Preliminary Report on Patentability with Written Opinion dated Jan. 21, 2021 for PCT/JP2019/014534.

(Continued)

*Primary Examiner* — Jesse S Bogue
(74) *Attorney, Agent, or Firm* — Soei Patent & Law Firm

(57) ABSTRACT

A turbocharger includes a turbine, a bearing housing, and a variable capacity mechanism. The variable capacity mechanism includes first and second plates and a connecting pin connecting the first and second plates to each other. The connecting pin includes a main body portion disposed between the first plate and the second plate, a first shaft portion disposed in a first through-hole of the first plate, and a second shaft portion disposed in a second through-hole of the second plate. The first plate is disposed on the side opposite to the bearing housing with respect to the second plate. The thickness of the first plate is larger than the thickness of the second plate and the length of the first shaft portion is equal to the length of the second shaft portion.

15 Claims, 6 Drawing Sheets

(56) References Cited

U.S. PATENT DOCUMENTS

| | | | | |
|---|---|---|---|---|
| 2013/0149129 | A1* | 6/2013 | Matsuyama | F01D 17/165 |
| | | | | 415/208.1 |
| 2014/0334918 | A1 | 11/2014 | Ueda et al. | |
| 2015/0211538 | A1 | 7/2015 | Aiba et al. | |
| 2015/0354444 | A1 | 12/2015 | Hayashi et al. | |
| 2017/0130646 | A1* | 5/2017 | Yoshizaki | F01D 17/165 |
| 2018/0030848 | A1* | 2/2018 | Kobayashi | F01D 17/165 |
| 2018/0230851 | A1* | 8/2018 | Katou | F01D 17/165 |
| 2018/0355889 | A1* | 12/2018 | Asakawa | F02B 37/24 |
| 2019/0153943 | A1 | 5/2019 | Asakawa et al. | |
| 2020/0408142 | A1 | 12/2020 | Sakamoto et al. | |
| 2021/0231028 | A1* | 7/2021 | Segawa | F01D 17/165 |

FOREIGN PATENT DOCUMENTS

| | | |
|---|---|---|
| JP | S63-061545 | 4/1988 |
| JP | H10-103070 | 4/1998 |
| JP | 2006-220053 | 8/2006 |
| JP | 2006-348892 | 12/2006 |
| JP | 2007-056791 | 3/2007 |
| JP | 2007-187015 | 7/2007 |
| JP | 2010-053774 | 3/2010 |
| JP | 2011-163266 | 8/2011 |
| JP | 2013-189898 | 9/2013 |
| JP | 5397144 | 1/2014 |
| JP | 2014-034910 | 2/2014 |
| WO | 2014/128895 | 8/2014 |
| WO | 2018/037807 | 3/2018 |
| WO | 2018/167931 | 9/2018 |

OTHER PUBLICATIONS

International Search Report dated May 28, 2019 for PCT/JP2019/014534.

* cited by examiner

VARIABLE CAPACITY TURBOCHARGER

CROSS-REFERENCE TO RELATED APPLICATIONS

This application is a continuation application of PCT Application No. PCT/JP2019/014534, filed Apr. 1, 2019, which claims the benefit of priority from Japanese Patent Application No. 2018-131638, filed Jul. 11, 2018, the entire contents of which are incorporated herein by reference.

BACKGROUND

Japanese Unexamined Patent Publication No. 2007-187015 describes a turbocharger including a base member and a shroud. The base member and the shroud are mutually connected to each other by a clearance pin while maintaining a predetermined gap. For example, a connecting means such as crimping is used to connect the clearance pin to the base member and the shroud.

SUMMARY

When crimping is used to connect the clearance pin to the base member and the shroud of a turbocharger, the length of a first portion inserted into the base member in the clearance pin is determined by the thickness of the base member, and the length of a second portion inserted into the shroud in the clearance pin is determined by the thickness of the shroud.

On the other hand, the thickness of the base member and the thickness of the shroud may be different from each other, for example, in order to ensure reliability or the like. Accordingly, the length of the first portion and the length of the second portion may be different from each other.

In such a case, in an assembly process, an operator may insert the second portion into the base member and insert the first portion into the shroud while misunderstanding the direction of the clearance pin. As a result, the erroneous assembly of the clearance pin occurs. Accordingly, there is a concern that productivity may be degraded.

The present disclosure describes a turbocharger capable of ensuring the reliability and improving the productivity at the same time.

An example turbocharger includes: a turbine including a turbine wheel having a rotation axis and a turbine housing accommodating the turbine wheel; a bearing housing disposed to be adjacent to the turbine in a rotation axis direction; and a variable capacity mechanism attached to the turbine housing, in which the variable capacity mechanism includes: a first plate provided with a first through-hole, a second plate disposed to face the first plate and provided with a second through-hole having an axis same as that of the first through-hole, and a connecting member disposed along the axis to connect the first plate to the second plate and define a distance between the first plate and the second plate. The connecting member includes a main body portion disposed between the first plate and the second plate, a first shaft portion provided at a first end of the main body portion and disposed in the first through-hole, and a second shaft portion provided at a second end of the main body portion and disposed in the second through-hole. The first shaft portion may include a first fixed portion fixed to the first plate by crimping. The second shaft portion may include a second fixed portion fixed to the second plate by crimping. The first plate may be disposed on the side opposite to the bearing housing with respect to the second plate. The thickness of the first plate may be larger than the thickness of the second plate. The length of the first shaft portion may be equal to the length of the second shaft portion.

DETAILED DESCRIPTION

Figure 1:
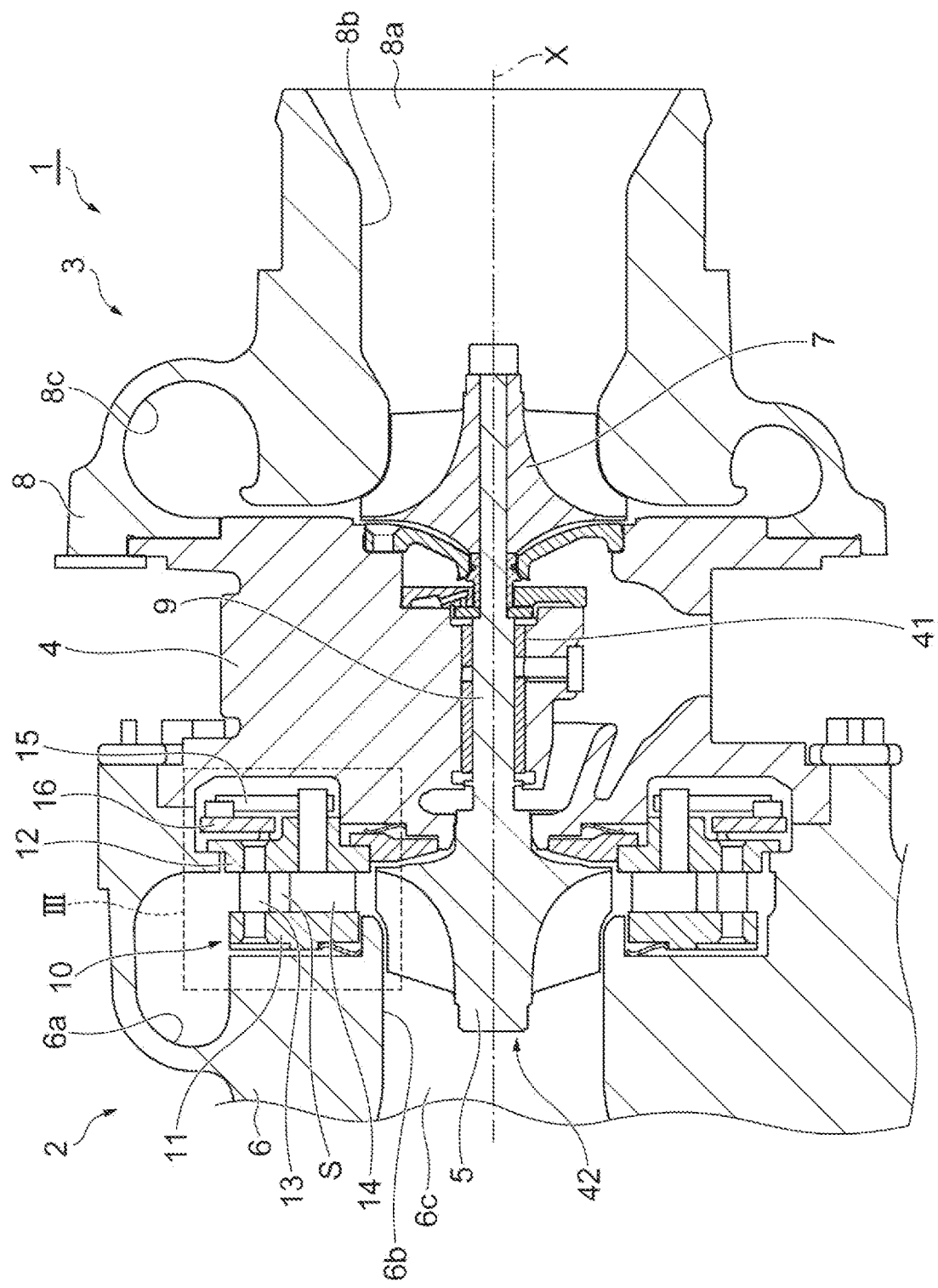
FIG. 1 is a cross-sectional view illustrating an example turbocharger.

An example turbocharger includes: a turbine including a turbine wheel having a rotation axis and a turbine housing accommodating the turbine wheel; a bearing housing disposed to be adjacent to the turbine in a rotation axis direction; and a variable capacity mechanism attached to the turbine housing, in which the variable capacity mechanism includes: a first plate provided with a first through-hole, a second plate disposed to face the first plate and provided with a second through-hole having an axis same as that of the first through-hole, and a connecting member disposed along the axis to connect the first plate to the second plate and define a distance between the first plate and the second plate. The connecting member includes a main body portion disposed between the first plate and the second plate, a first shaft portion provided at a first end of the main body portion and disposed in the first through-hole, and a second shaft portion provided at a second end of the main body portion and disposed in the second through-hole. The first shaft portion may include a first fixed portion fixed to the first plate by crimping. The second shaft portion may include a second fixed portion fixed to the second plate by crimping. The first plate may be disposed on the side opposite to the bearing housing with respect to the second plate. The thickness of the first plate may be larger than the thickness of the second plate. The length of the first shaft portion may be equal to the length of the second shaft portion.

In the turbocharger, the first plate may be disposed on the side opposite to the bearing housing with respect to the second plate. The first plate may be disposed at a position closer to the exhaust gas flowing through the turbine housing than the second plate. Accordingly, since the first plate may be exposed to a higher temperature environment than the second plate, thermal deformation may increase. Here, the thickness of the first plate may be larger than the thickness of the second plate. Accordingly, the thermal deformation of the first plate may be suppressed or inhibited from becoming larger than the thermal deformation of the second plate. Thus, a load may be suppressed or inhibited from being applied to the connecting member due to a difference in deformation amount between the first plate and the second plate to ensure the reliability of the turbocharger. Further, the first shaft portion of the connecting member may be disposed in the first through-hole and the second shaft portion of the connecting member may be disposed in the second through-hole. Then, the first shaft portion may include a first fixed portion fixed to the first plate by crimping and the second shaft portion may include a second fixed portion fixed to the second plate by crimping. Accordingly, the connecting member connects the first plate to the second plate and defines the distance between the first plate and the second plate. Here, the length of the first shaft portion may be equal to the length of the second shaft portion. Thus, even when the direction of the connecting member is reversed such that the first shaft portion is disposed in the second through-hole and the second shaft portion is disposed in the first through-hole, the connecting member can connect the first plate to the second plate and define the distance between the first plate and the second plate. Thus, the erroneous assembly of the connecting member may be prevented and the productivity may be improved to ensure the reliability of the turbocharger.

In some examples, the first plate may include a first inner surface facing the second plate and a first outer surface located on the side opposite to the first inner surface, the first outer surface of the first plate may be provided with a recess portion communicating with the first through-hole, and the thickness between the first inner surface and a bottom surface of the recess portion may be equal to the thickness of the second plate. The first fixed portion and the second fixed portion may be easily formed in the first shaft portion and the second shaft portion.

In some examples, the second plate may include a second inner surface facing the first plate and a second outer surface located on the side opposite to the second inner surface, the second outer surface may be provided with a spacer surrounding an opening on the side of the second outer surface in the second through-hole, and the thickness of the first plate may be equal to the sum of the thickness of the second plate and the thickness of the spacer. The first fixed portion and the second fixed portion are easily formed in the first shaft portion and the second shaft portion.

In the following description, with reference to the drawings, the same reference numbers are assigned to the same components or to similar components having the same function, and overlapping description is omitted.

An example turbocharger 1 illustrated in FIG. 1 may be, for example, a turbocharger for ships and vehicles using an exhaust gas discharged from an internal combustion engine to compress air supplied to the internal combustion engine. As illustrated in FIG. 1, the turbocharger 1 may include a turbine 2, a compressor 3, and a bearing housing 4 provided between the turbine 2 and the compressor 3. The turbine 2 includes a turbine wheel 5 which has a rotation axis X and a turbine housing 6 which accommodates the turbine wheel 5. The turbine housing 6 includes a turbine scroll passage 6a which extends in the circumferential direction around the turbine wheel 5. The compressor 3 includes a compressor wheel 7 and a compressor housing 8 which accommodates the compressor wheel 7. The compressor housing 8 includes a compressor scroll passage 8c which extends in the circumferential direction around the compressor wheel 7.

The turbine wheel 5 is provided at a first end of a rotation shaft 9 and the compressor wheel 7 is provided at a second end of the rotation shaft 9. The bearing housing 4 is disposed between the turbine 2 and the compressor 3 in the direction of the rotation axis X. The bearing housing 4 is disposed to be adjacent to the turbine 2 and the compressor 3 in the direction of the rotation axis X. The rotation shaft 9 is rotatably supported by the bearing housing 4 through a bearing 41. The rotation shaft 9, the turbine wheel 5, and the compressor wheel 7 rotate around the rotation axis X as a single rotation body 42.

The turbine housing 6 is provided with an inflow port through which the exhaust gas flows into the turbine scroll passage 6a, an outflow passage 6b which is fluidly coupled with the turbine scroll passage 6a, and an outflow port 6c through which the exhaust gas flows from the outflow passage 6b. The turbine wheel 5 is disposed in the outflow passage 6b. The exhaust gas discharged from the internal combustion engine flows into the turbine scroll passage 6a through an exhaust gas inflow port. Then, the exhaust gas flows into the outflow passage 6b, rotates the turbine wheel 5, and then flows to the outside of the turbine housing 6 through the outflow port 6c.

The compressor housing 8 is provided with a suction port 8a which sucks air, an inflow passage 8b which is fluidly coupled with the compressor scroll passage 8c, and a discharge port which discharges compressed air from the compressor scroll passage 8c. The compressor wheel 7 is disposed in the inflow passage 8b. When the turbine wheel 5 rotates as described above, the rotation shaft 9 and the compressor wheel 7 rotate. The rotating compressor wheel 7 compresses air sucked from the suction port 8a and the inflow passage 8b. The compressed air passes through the compressor scroll passage 8c and is discharged from the discharge port. The compressed air discharged from the discharge port is supplied to the internal combustion engine.

Figure 2A:
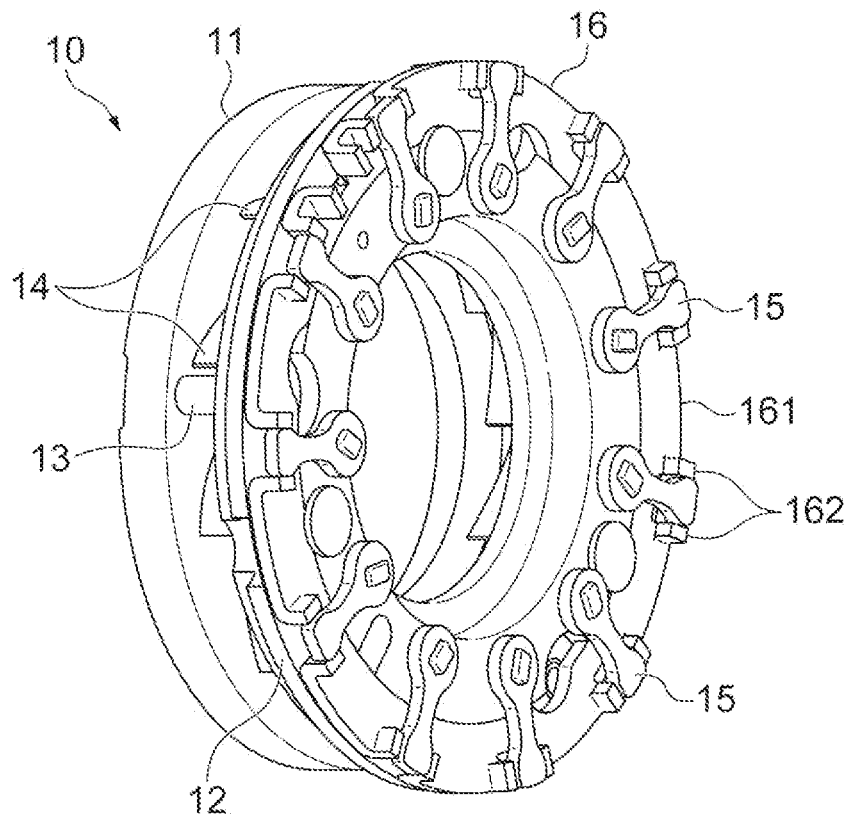
FIGS. 2A and 2B are respectively perspective views of a variable capacity mechanism of FIG. 1.
Figure 2B:
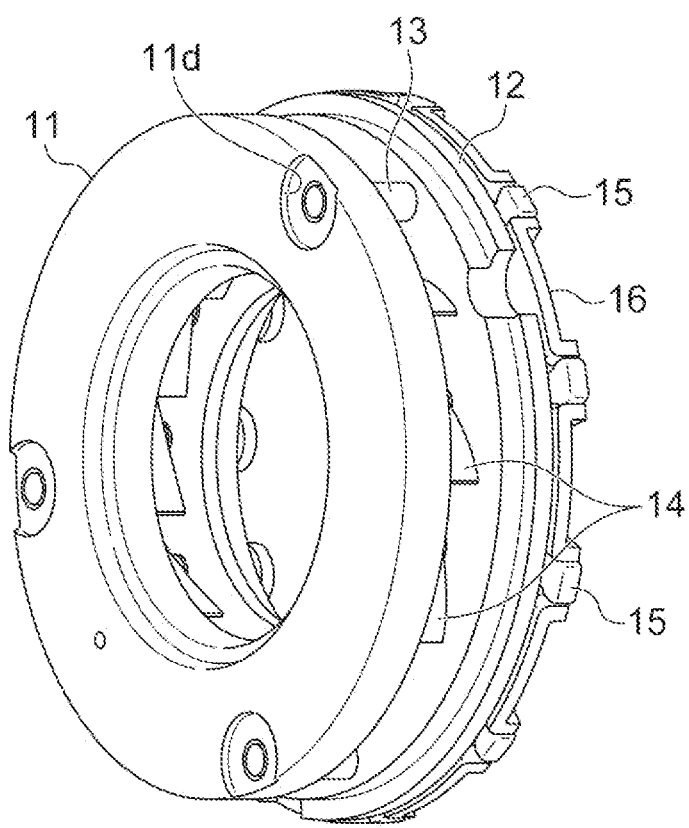

Next, the turbine 2 will be described in more detail. The turbocharger 1 includes a variable capacity mechanism 10 which is attached to the turbine housing 6. The turbine 2 is a variable capacity turbine. As illustrated in FIGS. 1 and 2, the variable capacity mechanism 10 includes a clearance control plate (CC plate, or a first plate) 11, a nozzle ring (a second plate) 12 which is disposed to face the CC plate 11, and a plurality of (for example three) clearance control pins (CC pins, or connecting members) 13 which connect the CC plate 11 to the nozzle ring 12. The variable capacity mechanism 10 may further include a plurality of (for example eleven) nozzle vanes 14 which are attached to the nozzle ring 12, a plurality of (for example eleven) nozzle link plates 15 which are disposed on the side opposite to the CC plate 11 with respect to the nozzle ring 12, and a drive ring 16 which rotates the nozzle link plate 15.

Each of the CC plate 11 and the nozzle ring 12 may have a ring shape around the rotation axis X. The CC plate 11 and the nozzle ring 12 may be disposed to surround the turbine wheel 5 in the circumferential direction (the circumferential direction around the rotation axis X). The CC plate 11 and the nozzle ring 12 may be disposed between the turbine scroll passage 6a and the outflow passage 6b. The CC plate 11 and the nozzle ring 12 may be disposed in parallel to each other and are separated from each other in the direction of the rotation axis X. A connection passage S is formed between the CC plate 11 and the nozzle ring 12. The connection passage S may connect the turbine scroll passage 6a to the outflow passage 6b.

The CC plate 11 may be disposed on the side opposite to the bearing housing 4 with respect to the nozzle ring 12. Accordingly, the CC plate 11 may be disposed at a position closer to the exhaust gas than the nozzle ring 12. During the operation of the turbocharger 1, the CC plate 11 may be exposed to a higher temperature environment than the nozzle ring 12.

Figure 3:
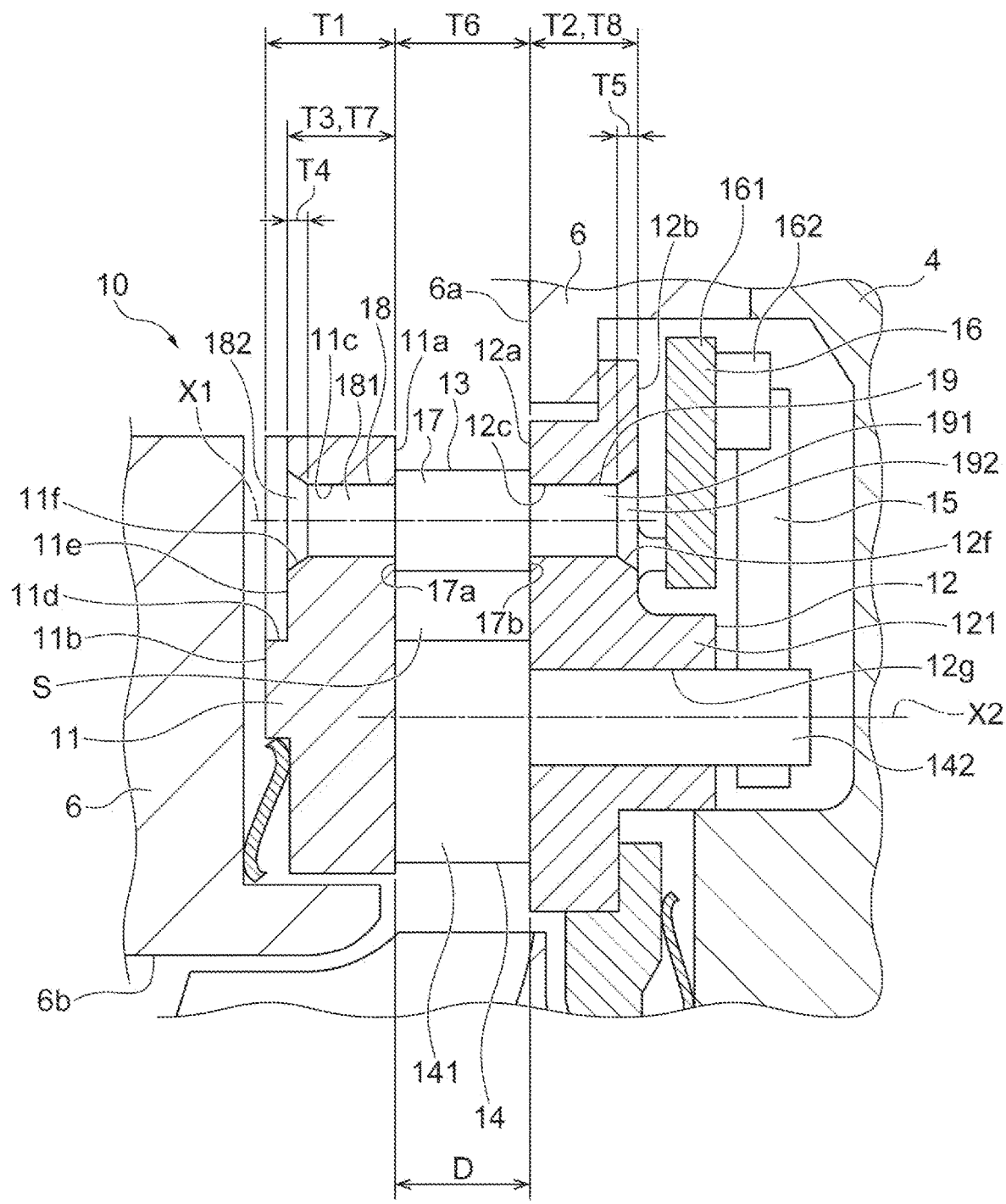
FIG. 3 is a partially enlarged view of FIG. 1.

As illustrated in FIG. 3, the CC plate 11 includes a first inner surface 11a which faces the nozzle ring 12 and a first outer surface 11b which is located on the side opposite to the first inner surface 11a. The CC plate 11 is provided with a plurality of (for example three) first through-holes 11c. The plurality of first through-holes 11c are formed at the same intervals in the circumferential direction. The first outer surface 11b of the CC plate 11 may be provided with, for example, a recess portion (counterbore) 11d which communicates with the first through-hole 11c. The diameter of the recess portion 11d may be larger than the diameter of the first through-hole 11c. The recess portion 11d may include a bottom surface 11e. The bottom surface 11e may be provided with a first chamfered portion 11f which communicates with the first through-hole 11c. The first through-hole 11c may include the first chamfered portion 11f.

The nozzle ring 12 includes a second inner surface 12a which faces the CC plate 11 and a second outer surface 12b which is located on the side opposite to the second inner surface 12a. The nozzle ring 12 is provided with a plurality of (for example three) second through-holes 12c. The plurality of second through-holes 12c are formed at the same intervals in the circumferential direction. Each second through-hole 12c corresponds to the first through-hole 11c. The second through-hole 12c has an axis X1 same as that of the first through-hole 11c. The axis X1 is parallel to the rotation axis X. The second outer surface 12b of the nozzle ring 12 may be provided with a second chamfered portion 12f which communicates with the second through-hole 12c. The second through-hole 12c may include the second chamfered portion 12f.

The nozzle ring 12 includes a protrusion portion 121 which protrudes from the second outer surface 12b. The protrusion portion 121 has a columnar shape around the rotation axis X. The outer diameter of the protrusion portion 121 is smaller than the outer diameter of the entire nozzle ring 12. The nozzle ring 12 is provided with a plurality of (for example eleven) third through-holes 12g penetrating the protrusion portion 121. The plurality of third through-holes 12g are formed at the same intervals in the circumferential direction. The third through-hole 12g is formed on the inside of the nozzle ring 12 in the radial direction in relation to the second through-hole 12c.

The thickness T1 of the CC plate 11 may be larger than the thickness T2 of the nozzle ring 12. The thickness of the CC plate 11 means the thickness of the portion provided with the first through-hole 11c. The thickness T1 of the CC plate 11 may be the distance between the first inner surface 11a and the first outer surface 11b. The thickness of the nozzle ring 12 means the thickness of the portion provided with the second through-hole 12c. The thickness T2 of the nozzle ring 12 is the distance between the second inner surface 12a and the second outer surface 12b. The thickness T3 between the first inner surface 11a and the bottom surface 11e of the recess portion 11d may be equal to the thickness T2 of the nozzle ring 12. The depth T4 of the first chamfered portion 11f may be equal to the depth T5 of the second chamfered portion 12f.

The CC pin 13 is disposed along the axis X1. Accordingly, the CC pin 13 has the common axis X1 as those of the first through-hole 11c and the second through-hole 12c. The CC pin 13 may include a main body portion 17 which is disposed between the CC plate 11 and the nozzle ring 12, a first shaft portion 18 which is provided at a first end (an end surface facing the CC plate 11) 17a of the main body portion 17, and a second shaft portion 19 which is provided at a second end (an end surface facing the nozzle ring 12) 17b of the main body portion 17. The first end 17a of the main body portion 17 may be in contact with the first inner surface 11a of the CC plate 11. The second end 17b of the main body portion 17 may be in contact with the second inner surface 12a of the nozzle ring 12. Accordingly, the length T6 of the main body portion 17 may be equal to the distance D between the CC plate 11 and the nozzle ring 12 (the distance between the first inner surface 11a and the second inner surface 12a).

The first shaft portion 18 is disposed in the first through-hole 11c. The length T7 of the first shaft portion 18 may be equal to the thickness T3 between the first inner surface 11a and the bottom surface 11e of the recess portion 11d. The first shaft portion 18 may include a first support portion 181 which is provided at the first end 17a of the main body portion 17 and a first fixed portion 182 which is provided on the side opposite to the main body portion 17 in the first support portion 181. The first fixed portion 182 may be disposed in the first chamfered portion 11f. The outer diameter of the first fixed portion 182 is larger than the outer diameter of the first support portion 181. The first fixed portion 182 may be fixed to the CC plate 11 by crimping. The first fixed portion 182 may be formed by crushing the end of the first support portion 181 through crimping.

The second shaft portion 19 is disposed in the second through-hole 12c. The length T8 of the second shaft portion 19 may be equal to the thickness T2 of the nozzle ring 12. Accordingly, the length T8 of the second shaft portion 19 may be equal to the length T7 of the first shaft portion 18. The second shaft portion 19 may include a second support portion 191 which is provided at the second end 17b of the main body portion 17 and a second fixed portion 192 which is provided on the side opposite to the main body portion 17 in the second support portion 191. The second fixed portion 192 may be disposed in the second chamfered portion 12f. The outer diameter of the second fixed portion 192 is larger than the outer diameter of the second support portion 191. The second fixed portion 192 may be fixed to the nozzle ring 12 by crimping. The second fixed portion 192 may be formed by crushing the end of the second support portion 191 through crimping. As described above, the CC pin 13 may connect the CC plate 11 to the nozzle ring 12 and define the distance D between the CC plate 11 and the nozzle ring 12.

The plurality of nozzle vanes 14 are disposed in the circumferential direction around the rotation axis X. The nozzle vane 14 includes a nozzle main body 141 and a nozzle shaft 142 which protrudes from the nozzle main body 141. The nozzle shaft 142 is inserted into the third through-hole 12g of the nozzle ring 12 so that the nozzle main body 141 is disposed between the CC plate 11 and the nozzle ring 12 (the connection passage S). The nozzle shaft 142 is inserted into the third through-hole 12g so that the end on the side opposite to the nozzle main body 141 protrudes from the protrusion portion 121 of the nozzle ring 12. The nozzle shaft 142 is rotatably supported by the nozzle ring 12. The nozzle main body 141 rotates in accordance with the rotation of the nozzle shaft 142. In the variable capacity mechanism 10, the cross-sectional area of the connection passage S is optimally adjusted by rotating the nozzle main body 141 so that the flow rate of the exhaust gas flowing from the turbine scroll passage 6a to the outflow passage 6b is controlled. Accordingly, the rotation speed of the turbine wheel 5 is optimally adjusted.

The drive ring 16 is disposed between the nozzle ring 12 and the nozzle link plate 15. The drive ring 16 has a ring shape around the rotation axis X. The drive ring 16 is rotatable around the rotation axis X. The drive ring 16 includes a main body portion 161 and a plurality of (for example eleven) attachment portions 162 which protrude from the main body portion 161. The attachment portions 162 are formed at the same intervals in the circumferential direction. The attachment portion 162 includes two attachment members that are separated from each other in the circumferential direction.

The nozzle link plate 15 has a bar shape. The first end of the nozzle link plate 15 is attached to the end of the nozzle shaft 142. The second end of the nozzle link plate 15 is attached to the attachment portion 162 of the drive ring 16. The second end of the nozzle link plate 15 is disposed between two attachment members of the attachment portion 162. When the drive ring 16 rotates around the rotation axis X by receiving a drive force from the outside, the second end of the nozzle link plate 15 attached to the attachment portion 162 moves along the circumferential direction in accordance with the rotation of the drive ring 16. Accordingly, the nozzle link plate 15 rotates around the axis X2 of the nozzle shaft 142. When the nozzle link plate 15 rotates, the nozzle shaft 142 attached to the first end of the nozzle link plate 15 rotates around the axis X2. In accordance with this rotation, the nozzle main body 141 attached to the first end of the nozzle shaft 142 rotates.

As described above, in the turbocharger 1, the CC plate 11 may be disposed on the side opposite to the bearing housing 4 with respect to the nozzle ring 12. Accordingly, the CC plate 11 may be disposed at a position closer to the exhaust gas flowing through the turbine housing 6 than the nozzle ring 12. Accordingly, since the CC plate 11 may be exposed to a higher temperature environment than the nozzle ring 12, thermal deformation may increase. In some examples, the thickness T1 of the CC plate 11 may be larger than the thickness T2 of the nozzle ring 12. Accordingly, the thermal deformation of the CC plate 11 may be suppressed or inhibited from becoming larger than the thermal deformation of the nozzle ring 12. Thus, a load may be suppressed or inhibited from being applied to the CC pin 13 due to a difference in deformation amount between the CC plate 11 and the nozzle ring 12 to ensure the reliability of the turbocharger 1.

Further, the first shaft portion 18 of the CC pin 13 is disposed in the first through-hole 11c and the second shaft portion 19 of the CC pin 13 is disposed in the second through-hole 12c. Then, the first shaft portion 18 may include a first fixed portion 182 which is fixed to the CC plate 11 by crimping and the second shaft portion 19 may include a second fixed portion 192 which is fixed to the nozzle ring 12 by crimping. Accordingly, the CC pin 13 may connect the CC plate 11 to the nozzle ring 12 and defines the distance D between the CC plate 11 and the nozzle ring 12. In some examples, the length T8 of the first shaft portion 18 may be equal to the length T9 of the second shaft portion 19. Thus, even when the direction of the CC pin 13 is reversed such that the first shaft portion 18 is disposed in the second through-hole 12c and the second shaft portion 19 is disposed in the first through-hole 11c, the CC pin 13 can connect the CC plate 11 to the nozzle ring 12 and define the distance D between the CC plate 11 and the nozzle ring 12. Thus, the erroneous assembly of the CC pin 13 may be prevented and the productivity may be improved. Accordingly, the reliability and productivity of the turbocharger 1 may be improved at the same time.

The CC plate 11 includes the first inner surface 11a which faces the nozzle ring 12 and the first outer surface 11b which is located on the side opposite to the first inner surface 11a. The first outer surface 11b of the CC plate 11 may be provided with the recess portion 11d which communicates with the first through-hole 11c. The thickness T3 between the first inner surface 11a and the bottom surface 11e of the recess portion 11d may be equal to the thickness T2 of the nozzle ring 12. Therefore, the first fixed portion 182 and the second fixed portion 192 may be easily formed in the first shaft portion 18 and the second shaft portion 19.

Figure 4:
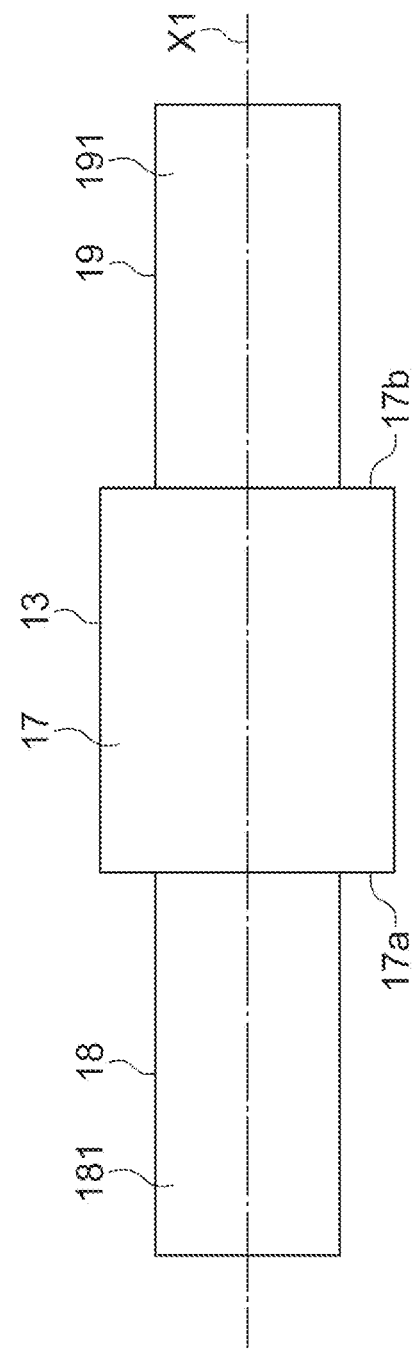
FIG. 4 is a side view before fixing a connecting member in FIG. 1.

Next, examples of manufacturing the variable capacity mechanism 10 will be described with reference to FIGS. 4, 5A 5B 6A and 6B. First, the CC plate 11, the nozzle ring 12, and the CC pin 13 are prepared. In some examples, as illustrated in FIG. 4, the CC pin 13 is first prepared. At this time, the first fixed portion 182 and the second fixed portion 192 of the CC pin 13 are not formed. Accordingly, the first shaft portion 18 and the second shaft portion 19 are not crushed by crimping. The length of the first shaft portion 18 at this time may be equal to the length of the second shaft portion 19.

Figure 5A:
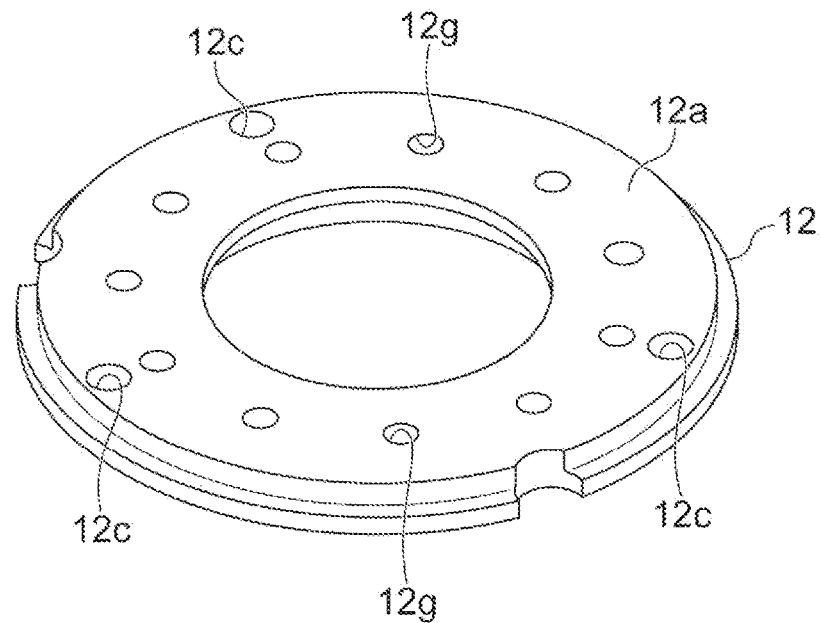
FIGS. 5A and 5B are respectively diagrams illustrating an example of manufacturing the variable capacity mechanism in FIG. 1.

Next, as illustrated in FIG. 5A, the CC plate 11 and the nozzle ring 12 are prepared. After the first step, the first shaft portion 18 is inserted into the first through-hole 11c, the first shaft portion 18 is fixed to the CC plate 11, the second shaft portion 19 is inserted into the second through-hole 12c, and the second shaft portion 19 is fixed to the nozzle ring 12 (the second step). Accordingly, the CC plate 11 and the nozzle ring 12 are connected to each other and the distance D between the CC plate 11 and the nozzle ring 12 is defined.

Figure 5B:
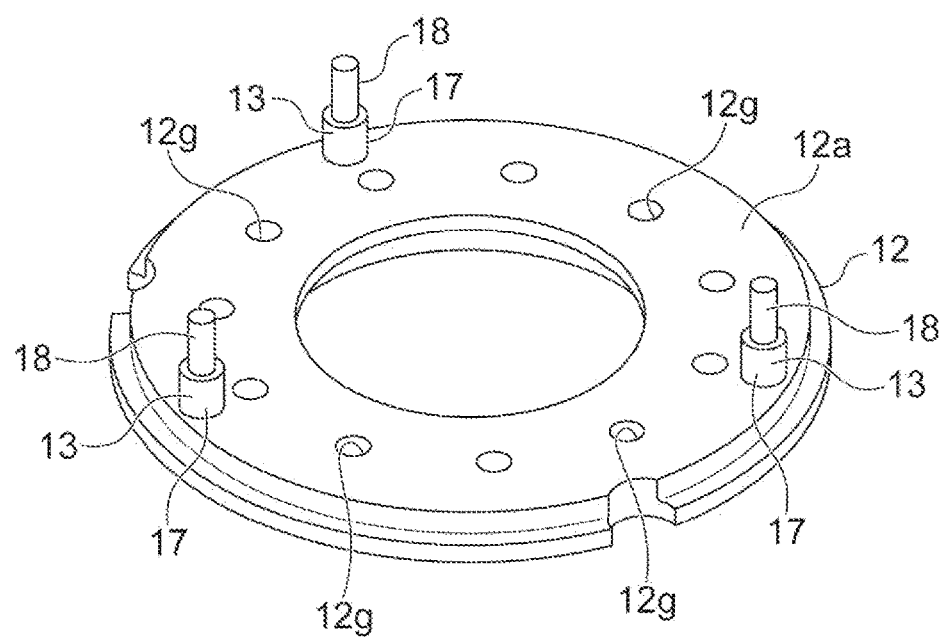

In some examples, as illustrated in FIG. 5B, first, the CC pin 13 is attached to the nozzle ring 12. The second shaft portion 19 of the CC pin 13 is inserted into the second through-hole 12c of the nozzle ring 12. The second shaft portion 19 is inserted into the second through-hole 12c so that the second end 17b of the main body portion 17 is in contact with the second inner surface 12a of the nozzle ring 12 (see FIG. 3).

Figure 6A:
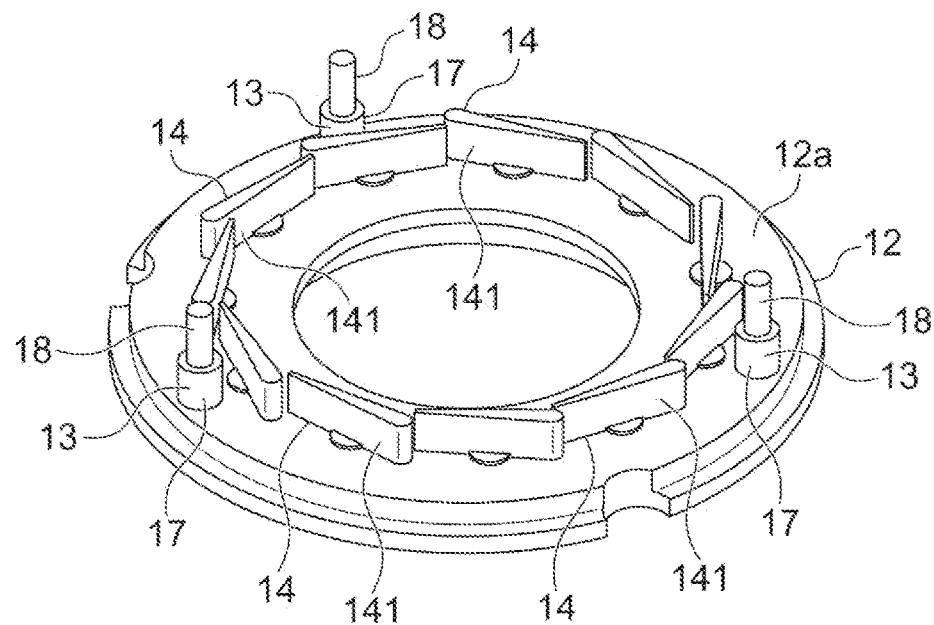
FIGS. 6A and 6B are respectively diagrams illustrating another example of manufacturing the variable capacity mechanism in FIG. 1.

Next, as illustrated in FIG. 6A, the nozzle vane 14 is attached to the nozzle ring 12. In some examples, the nozzle shaft 142 of the nozzle vane 14 (see FIG. 3) is inserted into the third through-hole 12g of the nozzle ring 12. The nozzle shaft 142 is inserted into the third through-hole 12g so that the nozzle main body 141 is located on the side of the second inner surface 12a of the nozzle ring 12 (see FIG. 3).

Figure 6B:
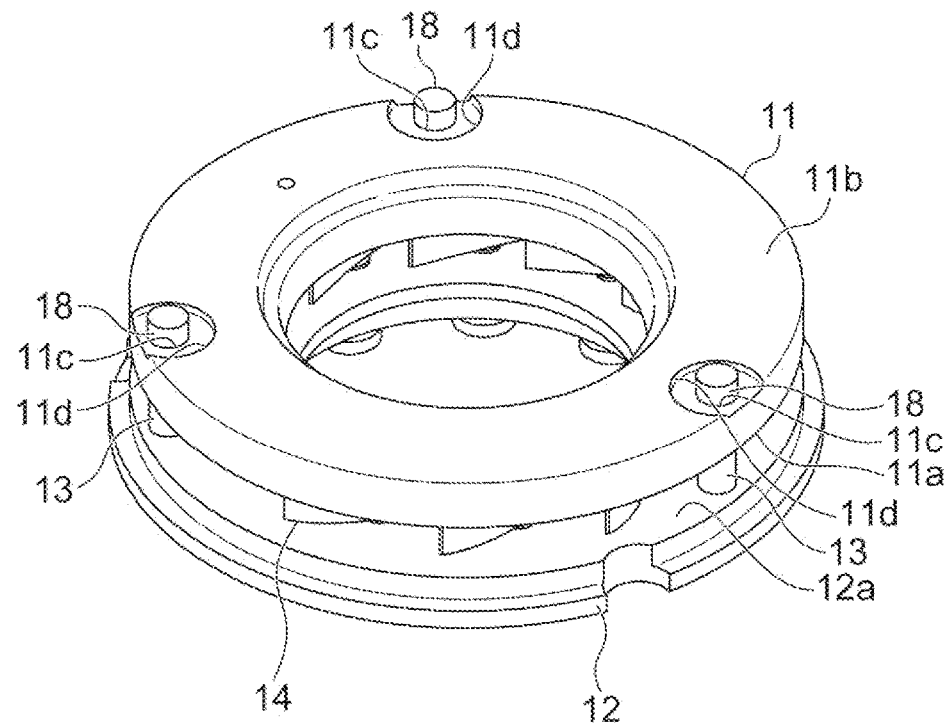

Next, as illustrated in FIG. 6B, the CC plate 11 is attached to the CC pin 13. In some examples, the first inner surface 11 of the CC plate 11 is allowed to face the second inner surface 12a of the nozzle ring 12 so that the first shaft portion 18 of the CC pin 13 is inserted into the first through-hole 11c of the CC plate 11. The CC plate 11 is disposed so that the first inner surface 11a is in contact with the first end 17a of the main body portion 17 of the CC pin 13 (see FIG. 3).

Next, the end of the first shaft portion 18 of the CC pin 13 is crushed by crimping to form the first fixed portion 182 (see FIG. 3). Next, the end of the second shaft portion 19 of the CC pin 13 is crushed by crimping to form the second fixed portion 192 (see FIG. 3). Accordingly, the CC pin 13 connects the CC plate 11 to the nozzle ring 12 and defines the distance D (see FIG. 3) between the CC plate 11 and the nozzle ring 12.

Next, the drive ring 16 is attached to the nozzle ring 12 (see FIG. 3). In some examples, the drive ring 16 is disposed on the side opposite to the CC plate 11 with respect to the nozzle ring 12 so that the drive ring 16 surrounds the protrusion portion 121 of the nozzle ring 12 in the circumferential direction. At this time, the attachment portion 162 of the drive ring 16 is disposed on the side opposite to the nozzle ring 12 with respect to the main body portion 161 of the drive ring 16. Next, the nozzle link plate 15 is attached to the drive ring 16 and the nozzle vane 14 (see FIG. 3). In some examples, the second end of the nozzle link plate 15 is disposed between two attachment members of the attachment portion 162 and then the first end of the nozzle link plate 15 is attached to the end of the nozzle shaft 142 of the nozzle vane 14.

In an example of manufacturing the variable capacity mechanism 10, the length of the first shaft portion 18 may be equal to the length of the second shaft portion 19. Thus, even when the direction of the CC pin 13 is reversed such that the first shaft portion 18 is inserted into the second through-hole 12c and the second shaft portion 19 is inserted into the first through-hole 11c, the CC pin 13 can connect the CC plate 11 to the nozzle ring 12 and define the distance D between the CC plate 11 and the nozzle ring 12. Thus, the erroneous assembly of the CC pin 13 is prevented and the productivity is improved.

Since the first shaft portion 18 may be fixed to the CC plate 11 by crimping to form the first fixed portion 182 and the second shaft portion 19 may be fixed to the nozzle ring 12 by crimping to form the second fixed portion 192, the length of the first shaft portion 18 including the first fixed portion 182 may be equal to the length of the second shaft portion 19 including the second fixed portion 192. Accordingly, not only the erroneous assembly of the CC pin 13 is prevented before crimping, but also the first fixed portion 182 and the second fixed portion 192 are formed at the same condition after crimping. This improves the reliability of the product.

It is to be understood that not all aspects, advantages and features described herein may necessarily be achieved by, or included in, any one particular example. Indeed, having described and illustrated various examples herein, it should be apparent that other examples may be modified in arrangement and detail.

The first outer surface 11b of the CC plate 11 may not be provided with the recess portion 11d. For example, a spacer may be provided in the second outer surface 12b of the nozzle ring 12 to surround an opening on the side of the second outer surface 12b of the second through-hole 12c. The thickness T1 of the CC plate 11 is equal to the sum of the thickness T2 of the nozzle ring 12 and the thickness of the spacer. Accordingly, the erroneous assembly of the CC pin 13 is prevented and the productivity is improved as discussed above. Further, the first fixed portion 182 and the second fixed portion 192 are easily formed in the first shaft portion 18 and the second shaft portion 19.

The first outer surface 11b of the CC plate 11 may not be provided with the recess portion 11d and the second outer surface 12b of the nozzle ring 12 may not be provided with the spacer. For example, the first through-hole 11c may extend from the first inner surface 11a of the CC plate 11 to the first outer surface 11b and the first chamfered portion 11f may be formed in the first outer surface 11b. Accordingly, the first fixed portion 182 may be formed on the side of the first inner surface 11a in relation to the first chamfered portion 11f.

In examples of manufacturing the variable capacity mechanism 10, an example in which the CC pin 13 is first attached to the nozzle ring 12 has been described, but the CC pin 13 may be first attached to the CC plate 11. In some examples, the first shaft portion 18 of the CC pin 13 is inserted into the first through-hole 11c of the CC plate 11. The first shaft portion 18 is inserted into the first through-hole 11c so that the first end 17a of the main body portion 17 is in contact with the first inner surface 11a of the CC plate 11. Further, the CC pin 13 may be attached to the CC plate 11 and the nozzle ring 12 at the same time. In some examples, after the nozzle vane 14 is first attached to the nozzle ring 12, the first shaft portion 18 may be inserted into the first through-hole 11c so that the first end 17a of the main body portion 17 is in contact with the first inner surface 11a of the CC plate 11 and the second shaft portion 19 may be inserted into the second through-hole 12c so that the second end 17b of the main body portion 17 is in contact with the second inner surface 12a of the nozzle ring 12.

In some examples, the second fixed portion 192 is formed after forming the first fixed portion 182, but the first fixed portion 182 may instead be formed after forming the second fixed portion 192. Further, the first fixed portion 182 and the second fixed portion 192 may be formed at the same time.

We claim all modifications and variations coming within the spirit and scope of the subject matter claimed herein.

We claim:

1. A turbocharger comprising:
    a turbine including a turbine wheel having a rotation axis and a turbine housing accommodating the turbine wheel;
    a bearing housing located adjacent to the turbine in an axial direction of the rotation axis; and
    a variable capacity mechanism attached to the turbine housing,
    wherein the variable capacity mechanism includes:
        a first plate provided with a first through-hole;
        a second plate that faces the first plate and includes a second through-hole axially aligned with the first through-hole; and
        a connecting member disposed along the rotation axis and connecting the first plate to the second plate, the first plate and the second plate separated from each other by the connecting member in the axial direction,
    wherein the connecting member includes:
        a main body portion disposed between the first plate and the second plate;
        a first shaft portion provided at a first end of the main body portion and disposed in the first through-hole; and
        a second shaft portion provided at a second end of the main body portion and disposed in the second through-hole,
    wherein the first shaft portion includes a first fixed portion fixed to the first plate by crimping,
    wherein the second shaft portion includes a second fixed portion fixed to the second plate by crimping,
    wherein the second plate is located between the first plate and the bearing housing,
    wherein a thickness of the first plate is larger than a thickness of the second plate in the axial direction, and
    wherein a length of the first shaft portion is equal to a length of the second shaft portion in the axial direction.

2. The turbocharger according to claim 1,
    wherein the first plate includes a first inner surface facing the second plate and a first outer surface located on an opposite side of the first plate to the first inner surface, and
    wherein the first outer surface of the first plate is provided with a recess portion that opens toward the first through-hole and a distance between the first inner surface and a bottom surface of the recess portion is equal to the thickness of the second plate.

3. The turbocharger according to claim 2, wherein the recess portion has a round shape.

4. The turbocharger according to claim 1,
    wherein the first plate includes a first chamfered portion and the first fixed portion is disposed in the first chamfered portion, and wherein the second plate includes a second chamfered portion and the second fixed portion is disposed in the second chamfered portion.

5. The turbocharger according to claim 1,
wherein the second plate includes a second inner surface facing the first plate and a second outer surface located on an opposite side of the second plate to the second inner surface,
wherein the second outer surface is provided with a spacer surrounding an opening of the second through-hole on the second outer surface, and
wherein the thickness of the first plate is equal to a sum of the thickness of the second plate and a thickness of the spacer in the axial direction.

6. A turbocharger comprising:
a turbine including a turbine wheel having a rotation axis and a turbine housing accommodating the turbine wheel;
a bearing housing located adjacent to the turbine in an axial direction of the rotation axis; and
a variable capacity mechanism attached to the turbine housing,
wherein the variable capacity mechanism includes:
  a first plate provided with a first through-hole;
  a second plate that faces the first plate and includes a second through-hole axially aligned with the first through-hole; and
  a pin disposed along the rotation axis and connecting the first plate, the first plate and the second plate separated from each other by the pin in the axial direction,
wherein the pin includes:
  a main body portion disposed between the first plate and the second plate;
  a first shaft portion provided at a first end of the main body portion and located in the first through-hole; and
  a second shaft portion provided at a second end of the main body portion and located in the second through-hole,
wherein the second plate is located between the first plate and the bearing housing,
wherein a thickness of the first plate is larger than a thickness of the second plate in the axial direction, and
wherein a length of the first shaft portion is equal to a length of the second shaft portion in the axial direction.

7. The turbocharger according to claim 6,
wherein the first plate includes a first inner surface facing the second plate and a first outer surface located on an opposite side of the first plate to the first inner surface, and
wherein the first outer surface of the first plate is provided with a recess portion that opens toward the first through-hole and a distance between the first inner surface and a bottom surface of the recess portion is equal to the thickness of the second plate.

8. The turbocharger according to claim 7, wherein the recess portion has a round shape.

9. The turbocharger according to claim 6,
wherein the first plate includes a first chamfered portion for crimping an end of the first shaft portion to fix the first shaft portion, and
wherein the second plate includes a second chamfered portion for crimping an end of the second shaft portion to fix the second shaft portion.

10. The turbocharger according to claim 6,
wherein the second plate includes a second inner surface facing the first plate and a second outer surface located on an opposite side of the second plate to the second inner surface,
wherein the second outer surface is provided with a spacer surrounding an opening of the second through-hole on the second outer surface, and
wherein the thickness of the first plate is equal to a sum of the thickness of the second plate and a thickness of the spacer in the axial direction.

11. A turbocharger comprising:
a turbine including a turbine wheel having a rotation axis and a turbine housing accommodating the turbine wheel, the turbine housing including a turbine scroll passage which extends around the turbine wheel; and
a variable capacity mechanism attached to the turbine housing,
wherein the variable capacity mechanism includes:
  a first plate provided with a first through-hole;
  a second plate that faces the first plate and includes a second through-hole axially aligned with the first through-hole, the first plate being disposed nearer to the turbine scroll passage than the second plate; and
  a pin disposed along the rotation axis and connecting the first plate to the second plate separated from each other by the pin in an axial direction of the rotation axis,
wherein the pin includes:
  a main body portion disposed between the first plate and the second plate;
  a first shaft portion provided at a first end of the main body portion and located in the first through-hole; and
  a second shaft portion provided at a second end of the main body portion and located in the second through-hole,
wherein a thickness of the first plate is larger than a thickness of the second plate in the axial direction, and
wherein a length of the first shaft portion is equal to a length of the second shaft portion in the axial direction.

12. The turbocharger according to claim 11,
wherein the first plate includes a first inner surface facing the second plate and a first outer surface located on an opposite side of the first plate to the first inner surface, and
wherein the first outer surface of the first plate is provided with a recess portion that opens toward the first through-hole and a distance between the first inner surface and a bottom surface of the recess portion is equal to the thickness of the second plate.

13. The turbocharger according to claim 12, wherein the recess portion has a round shape.

14. The turbocharger according to claim 11,
wherein the first plate includes a first chamfered portion for crimping an end of the first shaft portion to fix the first shaft portion, and
wherein the second plate includes a second chamfered portion for crimping an end of the second shaft portion to fix the second shaft portion.

15. The turbocharger according to claim 11,
wherein the second plate includes a second inner surface facing the first plate and a second outer surface located on an opposite side of the second plate to the second inner surface,
wherein the second outer surface is provided with a spacer surrounding an opening of the second through-hole on the second outer surface, and wherein the thickness of the first plate is equal to a sum of the thickness of the second plate and a thickness of the spacer in the axial direction.

* * * * *